May 15, 1962  A. D. LITTLEWOOD  3,034,308
STORAGE OF LIQUEFIED GASES
Filed Aug. 25, 1959
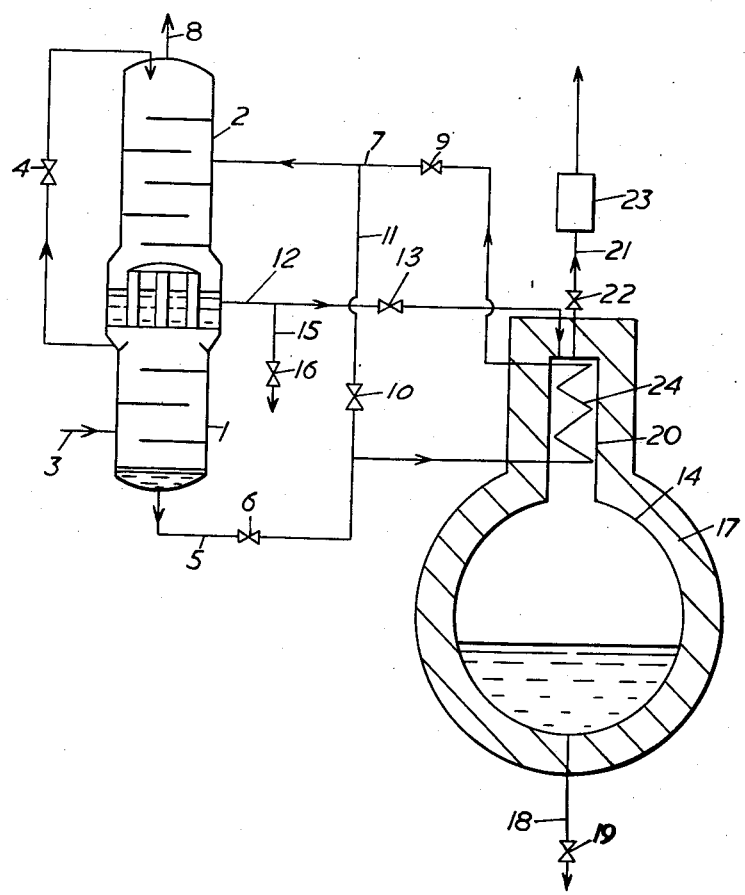
Inventor
ANTHONY DUNCAN LITTLEWOOD
By
Aaron L. Townshend Attorney

United States Patent Office 3,034,308
Patented May 15, 1962

3,034,308
STORAGE OF LIQUEFIED GASES
Anthony Duncan Littlewood, Woodford Green, England, assignor to The British Oxygen Company Limited, a company of Great Britain
Filed Aug. 25, 1959, Ser. No. 835,942
4 Claims. (Cl. 62—54)

This invention relates to the storage of liquefied gases, that is to say liquids which are gaseous at atmospheric pressure and temperature.

During the storage of such liquefied gases in a vessel, some loss of liquid occurs by evaporation due to influx of heat from the surrounding atmosphere to the liquid through the walls and supports of the vessel, even with efficient thermal insulation.

It is an object of the present invention to provide a method of and means for eliminating or substantially reducing such losses.

According to the instant invention, a method of reducing evaporation losses from a stored body of a liquefied gas produced by a low temperature gas producing plant comprises the steps of withdrawing from the gas producing plant a fluid whose temperature is below that of the saturated vapour evolved from the body of liquefied gas, passing the fluid in indirect heat exchange with the saturated vapour, whereby at least a part of the vapour is recondensed, and returning the fluid leaving said heat exchange step to the gas producing plant to recover its cold content.

The fluid withdrawn from the gas producing plant may be in liquid or gaseous form, provided that its temperature is below that of the saturated vapour. Where the fluid is a liquid, its passage in indirect heat exchange with the saturated vapour will normally result in its vaporisation, at least in part.

The invention may be applied, for example, to the storage of liquid oxygen or liquid argon produced by the low temperature separation of air. In this case, the fluid withdrawn from the separation plant may be liquid air or liquid nitrogen, or, where the air separation is carried out in a double column system, it may be the oxygen-enriched liquid produced in the high pressure column. This liquid is withdrawn from the high pressure column, expanded and passed into a condenser in which the saturated vapour evolved from the stored liquid oxygen or liquid argon is reliquefied. During its passage through the condenser, the oxygen-enriched liquid is wholly or partly vaporised. For the recovery of its cold content the wholly or partly vaporised product is returned to an appropriate point of the low pressure column of the air separation plant.

The invention may also be applied to the storage of liquefied hydrocarbon gases, produced by the low-temperature separation of natural gas or gas mixtures produced in oil refineries. For example, storage losses of liquid butane may be reduced by indirect heat exchange with liquid propane in the condenser and similarly for the storage of liquid propane, or liquid ethane, liquid methane may be used, and for the storage of liquid methane liquid nitrogen may be used for re-liquefaction. In each case the coolant leaving the condenser is returned to the producing plant for recovery of its residual cold content.

Where the producing plant is not a separation plant but a liquefaction plant and the stored liquid has the same composition as the re-condensing liquid, the required temperature difference in the condenser is achieved by keeping the storage pressure higher than the pressure of the coolant used for re-liquefaction.

Thus, in the storage of liquid hydrogen or liquid nitrogen produced in a hydrogen or nitrogen liquefaction plant, the condensing fluid withdrawn from and returned to the liquefaction plant will be liquid hydrogen or nitrogen at a lower pressure and therefore at a lower temperature than the stored liquid.

The body of liquefied gas may be stored in a thermally insulated storage vessel and the condensing fluid passed through a heat exchange coil serving as the condenser and mounted in the vapour space above the liquid level. Excessive refrigeration in the condenser will tend to lower the pressure in the storage vessel below its desired value. This can be prevented by controlling the pressure or admitted quantity of the coolant, if necessary automatically by, for example, the pressure in the storage vessel. In tanks vented to the atmosphere and in which liquids of a boiling point higher than liquid air are stored and used for reliquefaction excess refrigeration in the re-liquefier will cause the storage pressure to drop a little below the atmospheric pressure with the effect that some air enters the storage vessel and partially blankets the re-liquefier. This automatically reduces the rate of re-liquefaction and an equilibrium condition will soon establish itself at which the pressure has returned to its normal value while at the same time contamination of the stored liquid by air is avoided.

In the vent line from the storage vessel to atmosphere, a carbon dioxide absorber and drier may be provided to prevent deposition of ice on the surface of the re-liquefier. The vent connection should be located in the vessel at a point such that atmospheric air entering through the connection surrounds the condensing coil. Conveniently, the connection to atmosphere may also serve as a vent for saturated vapour in case of lack of refrigeration.

One form of apparatus according to the invention for the production and storage of liquid oxygen at atmospheric pressure is illustrated diagrammatically in the accompanying drawing.

The liquid oxygen is produced in a conventional air separation plant of which for the sake of clarity only the rectification section is shown in the drawing. It will be appreciated, however, that the plant will include the usual components, such as an air compressor and heat exchangers which are customary in such plants.

The rectification section of the plant is a conventional double column comprising a high pressure column 1 working at about 5 atmg. pressure and a low pressure column 2 working at slightly above atmospheric pressure. Air is fed to the high pressure column 1 at 3 and is separated into an oxygen-enriched liquid fraction which collects at the bottom of the column and a liquid nitrogen fraction at the top of the column. A part of the liquid nitrogen fraction is withdrawn and expanded through a valve 4 into the top of the low pressure column to serve as reflux therein. The oxygen-enriched liquid collecting at the bottom of the high pressure column 1 is withdrawn through a pipe 5, expanded in a valve 6 and thereafter used to condense saturated vapour evolved from a stored body of liquid oxygen in accordance with the invention by a heat exchange in which it is at least partly vaporised, as hereinafter described, and after which it is passed through a pipe 7 to the low pressure column 2. In this column a gaseous nitrogen fraction is separated at 8 and a liquid oxygen fraction is obtained in the sump. In storage vessels closed against the atmosphere, the control of refrigeration may be effected either by means of a pressure control valve 9 on the pipe 7 or by a by-pass valve 10 in a line 11 directly connecting pipes 5 and 7.

The liquid oxygen is withdrawn from the low pressure column 2 through a pipe 12 and a control valve 13 and fed to a storage vessel 14. If desired part of the liquid oxygen may be withdrawn for immediate use through a pipe 15 and a valve 16, branching from the pipe 12. The storage vessel 14 is surrounded by thermal insulation 17 and is provided with a withdrawal pipe 18 for liquid oxygen located at the bottom of the vessel, with a valve 19.

The vessel 11 is provided with an extended neck portion 20. A vent 21 provided with a valve 22 leads from the top of the neck portion 20 to atmosphere through a drier and carbon dioxide absorber 23. Within the neck portion 20 is mounted a heat exchange coil 24, connected at its lower end to the pipe 5 and at its upper end to the pipe 7.

In operation with valve 22 open liquid oxygen produced in the separation plant is run through line 12 into the vessel 14 for storage at atmospheric pressure. Oxygen-enriched liquid is withdrawn through pipe 5, expanded through valve 6 and passes through the heat exchange coil 24 where it condenses by heat exchange saturated vapour evolved from the stored liquid oxygen and rising through the neck portion 20 to the vent 21. The oxygen-enriched liquid which is thereby at least partially vaporised then passes through pipe 7 to the low pressure column 2.

Should the refrigeration provided by the oxygen-enriched liquid passing through the coil 24 be excessive so that condensation of the saturated oxygen vapour takes place to an extent such that the pressure in the vessel 14 is lowered slightly below atmospheric, atmospheric air will automatically be drawn into the vessel 14 through the vent 21 having its water and carbon dioxide removed in the vessel 23. The dry air enters the neck portion 20 and surrounds the coil 24. Since the condensing temperature of the air is lower than that prevailing in coil 24, condensation of the evolved oxygen vapour is reduced or temporarily stopped until further vaporisation of liquid oxygen in the vessel 14 expels the air drawn into the vessel when condensation will proceed as before. By this process an equilibrium condition will establish itself in which the coil 24 is partially blanketed by air and the reliquefaction of oxygen vapour will balance the vaporisation of stored liquid oxygen in the vessel 14.

When the vent valve 22 is closed, a balance between the quantities of liquid oxygen vaporised in the vessel 14 and oxygen vapour recondensed in the coil 24 may be achieved and hence constant pressure in the vessel 14 maintained by using valve 8 or 9, automatically controlled by the pressure in the vapour space 20 of the vessel 14 so as to control the pressure and hence temperature, or flow rate of the oxygen-enriched liquid.

It will be appreciated that the embodiment described with reference to the drawing is only by way of example and other arrangements of apparatus within the scope of the invention may be used.

I claim:

1. In the method of reducing or eliminating evaporation losses from a stored body of a liquefied gas produced by a low-temperature plant wherein a fluid whose temperature is below that of the saturated vapour evolved from said body of liquefied gas is withdrawn from said plant, passed through a heat exchanger in indirect heat exchange with said saturated vapour, whereby at least a part of said saturated vapour is re-condensed, and the fluid returned to said plant, the step of automatically controlling the heat exchange between said saturated vapour and said fluid to maintain the storage pressure of said stored body of liquefied gas within desired limits, by interposing between said saturated vapour and said fluid when the rate of condensation of saturated vapour by the heat exchange is in excess of the rate of evolution of said vapour by reason of heat inleak to said stored body of liquefied gas, a layer of a gas whose condensation temperature is lower than the temperature of said fluid.

2. In the method of reducing or eliminating evaporation losses from a stored body of liquid oxygen produced by a low-temperature air separation plant wherein an oxygen-enriched liquid fraction is withdrawn from said plant, passed through a heat exchanger in indirect heat exchange with saturated vapour evolved from said stored body of liquid oxygen, whereby at least a part of said saturated vapour is recondensed, and said oxygen-enriched fraction returned to said plant, the step of automatically controlling the heat exchange between said saturated vapour and said oxygen-enriched liquid fraction to maintain the storage pressure of said stored body of liquid oxygen within desired limits by interposing between said saturated vapour and said fluid a layer of dry air when the rate of condensation of saturated vapour by the heat exchange is in excess of the rate of evolution of said vapour by reason of heat inleak to said stored body of liquid oxygen.

3. Apparatus for producing and storing a liquefied gas comprising a low-temperature plant for producing said liquefied gas, a thermally insulated storage vessel for holding a body of said liquefied gas, a conduit for transferring said liquefied gas produced by said plant to said storage vessel, a heat exchange coil mounted within said storage vessel above the level of said body of liquefied gas contained therein for condensing saturated vapour evolved from said body of liquefied gas by heat inleak thereto, first conduit means for conducting a fluid whose temperature is below that of said saturated vapour from said plant to one end of said heat exchange coil, second conduit means for returning fluid leaving the other end of said heat exchange coil to said plant, and means for automatically surrounding said heat exchange coil with a layer of a gas whose condensation temperature is below the temperature of said fluid, when the rate of condensation of said saturated vapour is in excess of the rate of evolution of said vapour by reason of heat inleak to said storage vessel.

4. Apparatus for producing and storing liquid oxygen comprising a low-temperature air separation plant, a thermally-insulated storage vessel for holding a body of liquid oxygen, a conduit for transferring liquid oxygen produced by said plant to said storage vessel, a heat exchange coil mounted within said storage vessel above the level of said body of liquid oxygen contained therein for condensing saturated vapour evolved from said body of liquid oxygen by heat inleak thereto, first conduit means for conducting an oxygen-enriched liquid fraction from said plant to one end of said heat exchange coil, second conduit means for returning said fraction leaving the other end of said heat exchange coil to said plant, and a vent connecting the vapour space of said storage vessel to atmosphere through a moisture removing device, said vent being so located with respect to said heat exchange coil that when air is drawn through said vent into said storage vessel when pressure in said vessel is reduced by the rate of recondensation of saturated vapour exceeding the rate of evolution of saturated vapour by heat inleak to said stored body of liquid oxygen, said air surrounds said heat exchange coil and thereby serves to prevent further condensation of saturated vapour.

References Cited in the file of this patent

UNITED STATES PATENTS

| | | |
|---|---|---|
| 2,344,765 | Dana et al. | Mar. 21, 1944 |
| 2,670,605 | Van Zandt et al. | Mar. 2, 1954 |
| 2,708,831 | Wilkinson | May 24, 1955 |
| 2,741,094 | Schuftan | Apr. 10, 1956 |
| 2,959,928 | Maker | Nov. 15, 1960 |